G. R. MOORE.
CAR-STARTER.
No. 176,542. Patented April 25, 1876.
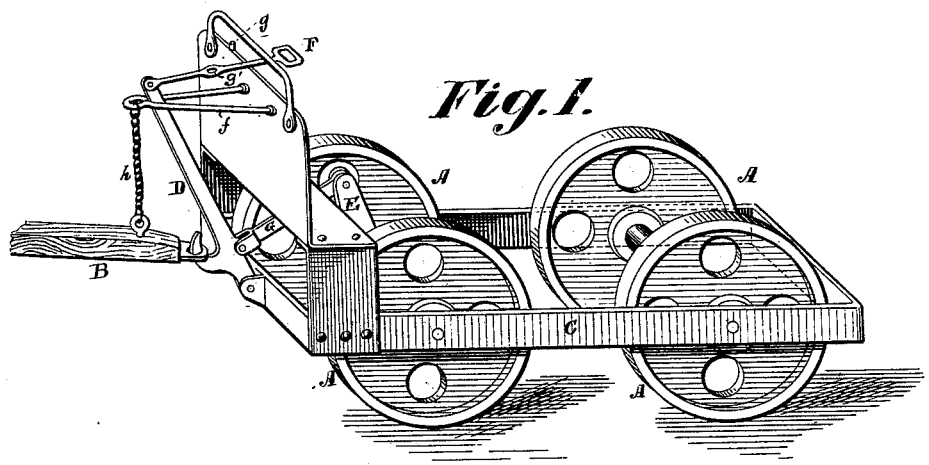
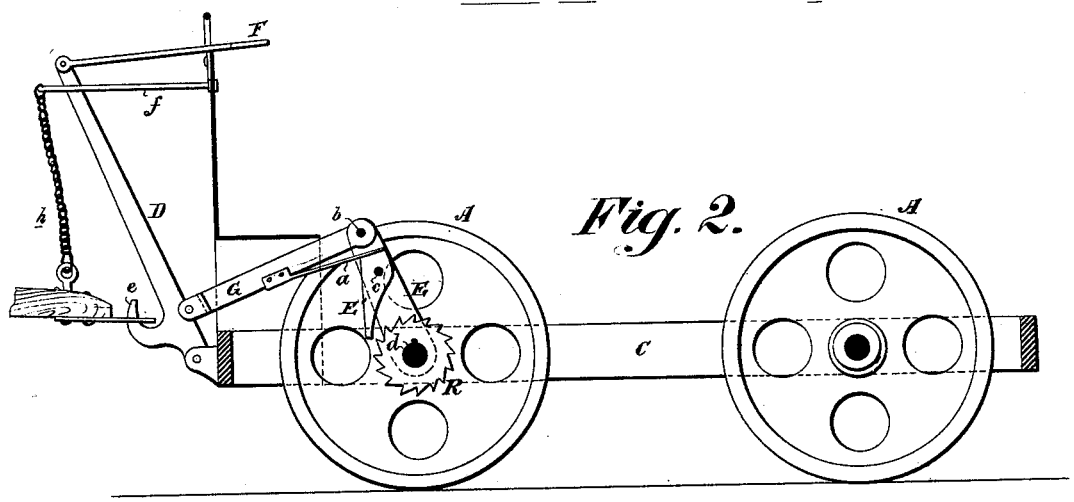
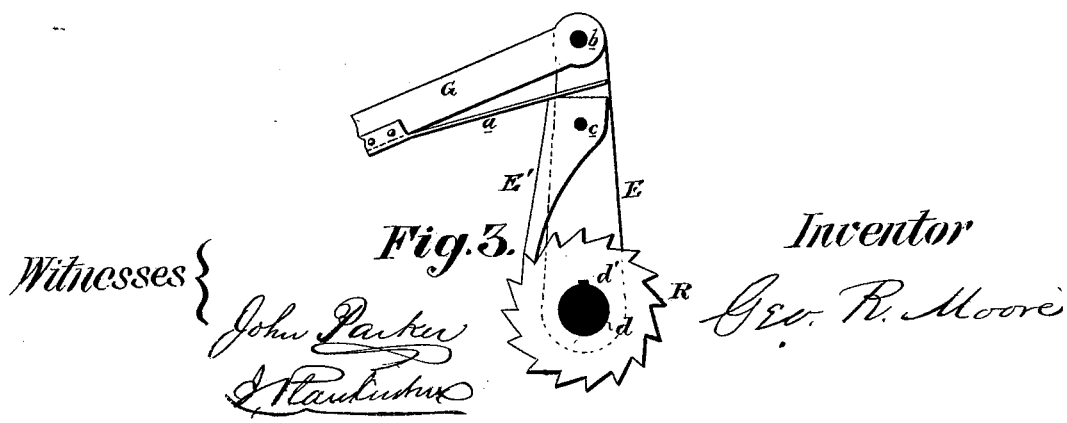
Witnesses
John Parker
J. Hawkins
Inventor
Geo. R. Moore

UNITED STATES PATENT OFFICE.

GEORGE R. MOORE, OF PHILADELPHIA, PENNSYLVANIA.

IMPROVEMENT IN CAR-STARTERS.

Specification forming part of Letters Patent No. 176,542, dated April 25, 1876; application filed March 16, 1876.

*To all whom it may concern:*

Be it known that I, GEO. R. MOORE, of the city and county of Philadelphia, in the State of Pennsylvania, have invented certain new and useful Improvements in Car-Starters, which improvements are fully set forth in the following specification, reference being had to the accompanying drawings.

The object of my invention is mainly to provide facilities for overcoming in starting standing cars or vehicles their inertia, applying momentarily the motive power used (whatever it may be in running cars or vehicles) to a grab-lever, playing fast and loose upon an axle of the wheels, so that the power within a prescribed limit will be increased, will move faster for a moment than the cars, overcome inertia, then automatically slip out of gear, and leave the car to move on as freely as if no starter were connected with it; also, to provide facilities for using manually the said lever on the axle either with or without the ordinary draft-power concerned.

Availing myself of the old mechanism of a fixed ratchet-wheel upon a revolving axle, I have invented improved devices and combinations for its practical use, so that the operator (usually the driver of the car) may conveniently, and at will, apply a strong grab-lever and obtain a purchase to revolve the axle of the car or vehicle, either standing or in motion. This he may do either independently or with the ordinary power used to run the car or vehicle.

Figure 1 is a perspective view of a skeleton car-frame and running-gears with my devices applied. Fig. 2 is a longitudinal vertical section. Fig. 3 is an enlarged view of some of the parts shown in Fig. 2 in their normal place, and showing the position of the pawl when the starter is in gear.

A, wheels; B, tongue; C, frame. D is an operating-lever, through which all the draft-power for moving the car is applied, placed in an upright position, and jointed at its lower end to the frame C. It receives the tongue, whiffletree, or any other instrument for connecting the motive power to the car upon the hook $e$, placed at any desired purchasing distance upon the lever, with a view to increasing or diminishing the power of the starter. It also carries the connecting-bar G and the manual handle or rod F, by which it can be operated, and the car moved by the driver alone. E is a slotted lever, with the axle of the car for its fulcrum, upon which it is hung loosely. It is pivoted to G at $b$, and has between its sides the pawl E', pivoted at $c$; also, the ratchet-wheel R is rigidly fastened to the axle of the car at $d$, but runs loosely between the sides of the lever E, except when prevented by the pawl E', which acts as a grab for the lever in which it is placed whenever, being desired, it is thrown into the requisite position. F is a hand-lever or draw-rod, for the operator's use whenever he chooses to bring it into requisition. He can always see by it how the starter is standing, whether in gear or out of gear, and be governed accordingly. If he chooses to keep the starter out of gear with the ratchet on the axle, he has only to place the aperture $g'$ over the pin $g$, and his object will be accomplished, and in that condition the starter will continue to be in relation to either running or backing the car, as if it were not.

I have brought this manual handle convenient to the driver without interfering with the usual place for the brake-crank and handle.

$f$ is a guard-frame, extending out from the main frame of the car, to protect the lever D, and to afford a support for the tongue B through the rod or chain $h$, which is so adjusted that it holds the tongue at the same level whether the starter is in gear or out of it, which is a desirable point gained. $a$ is a spring upon the lower side of the connecting-bar G. It is double-acting upon the pawl E'. As seen in Fig. 3, the force of the spring is holding the pawl in gear; but as seen in Fig. 2 it holds the same pawl out of gear, and in this situation prevents the noise and other evils of a swinging pawl, or one that operates simply by its own weight.

Briefly, the operation of this starter is as follows: The small ratchet-wheel firmly fixed upon the axle of the car runs at all times freely between the arms of the lever E, as long as the same is kept inclined a little forward, in which position the pawl E' hangs free from the ratchet-wheel; but if the lever D is drawn back it will carry back the connecting-bar G, and thus E, carrying the pawl E' far enough back to play upon the ratchet-wheel. Then, if E is thrown forward again faster than the car is moving, (or if the car is standing still,) it will give the draft-power the whole advantage of a lever purchase to revolve the axle for a brief space; then, as the axle turns farther than the lever carried it, the pawl drops forward out of gear, and the axle is again free, until, by repeating the process, another connection is made, which, of course, may be done so rapidly as to give the car a continuous headway.

I claim as my invention—

1. The upright operating-lever D, pivoted to the car-frame for its fulcrum at its lower end, and carrying, by the connecting-bar G, the slotted vibrating lever E, having its fulcrum upon the revolving axle of the car, and provided with a pawl, E', in combination with the revolving car-axle, with its rigid ratchet-wheel R, all arranged and combined substantially as and for the purpose herein set forth.

2. The upright operating-lever D, in combination with the car-frame and the connecting-bar G, and provided with the horizontal pull-rod F, substantially as and for the purpose herein set forth.

3. The guard-frame f, extending out horizontally in front of the car, at or near the upper end of the operating-lever D, and inclosing the same, substantially as and for the purpose herein set forth.

4. The connecting-bar G, provided with the spring a, for operating upon the broad head of the pawl E', to hold the same firmly in gear with the ratchet-wheel R, or out of the same, as may be required, substantially as shown.

5. The stay-pin g upon the frame of the car, in combination with the hand-pull F, substantially as and for the purpose herein set forth.

6. In combination with the guard-frame f and tongue B, the supporting rod or chain h, substantially as and for the purpose herein set forth.

7. The pawl E', provided with a broad top, for affording a bearing to the spring a on either side of its pivot c, and in combination with spring a and the ratchet-wheel R, substantially as and for the purpose herein set forth.

GEO. R. MOORE.

Witnesses:
J. PLANKINTON,
GEO. B. HOWELL.